(12) United States Patent
Telfer et al.

(10) Patent No.: US 8,719,411 B2
(45) Date of Patent: *May 6, 2014

(54) METHOD AND SYSTEM FOR MONITORING MESSAGES PASSED OVER A NETWORK

(71) Applicant: Inetco Systems Limited, Burnaby, CA (US)

(72) Inventors: Angus Richard Telfer, Vancouver (CA); Alfred Yu-Han Pang, Vancouver (CA); Martin Robert Childs, Vancouver (CA); Christopher Charles Hunt, Anmore (CA)

(73) Assignee: Inetco Systems Limited, Burnaby (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/779,504

(22) Filed: Feb. 27, 2013

(65) Prior Publication Data
US 2013/0227125 A1 Aug. 29, 2013

Related U.S. Application Data

(63) Continuation of application No. 11/689,099, filed on Mar. 21, 2007, now Pat. No. 8,396,959.

(51) Int. Cl.
*G06F 15/173* (2006.01)

(52) U.S. Cl.
USPC ............................ 709/224; 709/223; 709/226

(58) Field of Classification Search
USPC ................................................. 709/223–226
See application file for complete search history.

(56) References Cited

U.S. PATENT DOCUMENTS

| 5,101,402 | A | 3/1992 | Chiu et al. |
|---|---|---|---|
| 6,122,664 | A | 9/2000 | Boukobza et al. |
| 6,574,241 | B2 | 6/2003 | Vasarainen |
| 6,587,439 | B1 | 7/2003 | Arcieri et al. |
| 6,681,230 | B1 | 1/2004 | Blott et al. |
| 6,801,940 | B1 | 10/2004 | Moran et al. |
| 6,834,307 | B2 | 12/2004 | Magnussen et al. |
| 7,373,410 | B2 | 5/2008 | Monza et al. |
| 8,296,413 | B2 | 10/2012 | Bornhoevd et al. |

(Continued)

FOREIGN PATENT DOCUMENTS

EP 2 127 221 B1 5/2012

OTHER PUBLICATIONS

Abadi, et al., "Aurora: A New Model and Architecture for Data Stream Management", The VLDB Journal (2003).

(Continued)

*Primary Examiner* — Tae Kim
(74) *Attorney, Agent, or Firm* — Gowling Lafleur Henderson LLP; Joseph Conneely

(57) ABSTRACT

A method for monitoring an application, comprising: receiving a message from the application; storing the message in a message data buffer in a data store; selecting one or more module instances to define a monitoring function for the application, each module instance for independently performing a respective aspect of the monitoring function, each module instance independently accessing the message data buffer directly from the data store to process data contained therein to perform its aspect of the monitoring function; and, initiating operation of the one or more module instances in accordance with a schedule defined by one or more routing rules, the one or more routing rules for routing a pointer to the message, as stored in the message data buffer, between the one or more module instances to thereby perform the monitoring function without passing the message itself between the one or more module instances.

21 Claims, 9 Drawing Sheets

(56) References Cited

U.S. PATENT DOCUMENTS

| | | |
|---|---|---|
| 2004/0081183 A1 | 4/2004 | Monza et al. |
| 2004/0083195 A1 | 4/2004 | McCord et al. |
| 2004/0243349 A1 | 12/2004 | Greifeneder et al. |
| 2005/0273517 A1 | 12/2005 | Patrick et al. |
| 2005/0273521 A1 | 12/2005 | Patrick et al. |
| 2006/0036670 A1 | 2/2006 | Musman |
| 2006/0135136 A1 | 6/2006 | Kim et al. |
| 2006/0143439 A1 | 6/2006 | Arumugam et al. |
| 2006/0167784 A1 | 7/2006 | Hoffberg |
| 2007/0282988 A1 | 12/2007 | Bornhoevd et al. |
| 2007/0283002 A1 | 12/2007 | Bornhoevd et al. |
| 2008/0162208 A1 | 7/2008 | Waguet |

OTHER PUBLICATIONS

Yao, et al., "The Cougar Approach to In-Network Query Processing in Sensor Networks", SIGMOD Record, Vol. 31, No. 3, Sep. 2002.
Golab, et al., "Issues in Data Stream Management", University of Waterloo (Canada), SIGMOD Record 2003.
Fiege, et al., "Engineering Event-Based Systems With Scopes", Darmstadt University of Technology (Darmstadt), ECOOP Proceedings, 2002.
Carzaniga, et al., "Issues in Supporting Event-Based Architectural Styles", 3rd International Software Architecture Workshop, 1998.
Pietzuch, Peter R., "Event-Based Middleware: A New Paradigm for Wide-Area Distributed Systems?", 6th Cabernet Radicals Workshop, Feb. 2002.
Cranor, et al., "The Gigascope Stream Database", Bulletin of the IEEE Computer Society Technical Committee on Data Engineering, 2003.
Cooper, et al., "HIHI: A Unified Architecture for High Fan-In Systems", Proceedings of the 30th VLDB Conference, Toronto, Canada, 2004.
Lee, et al., "Data Mining Approaches for Intrusion Detection", Proceedings of the 7th Usenix Security Symposium, 1998.
Campbell, et al., "IRISNET: An Internet-Scale Architecture for Multimedia Sensors", MM '05 Singapore, Nov. 6-11, 2005.
Witten, et al., "Jade: A Distributed Software Prototyping Environment", Operating Systems Review, 1983.
Chen, et al., "Niagaracq: A Scalable Continuous Query System for Internet Databases", MOD 2000, Dallas, TX, USA, 2000.
Luckham, David C., "Rapide: A Language and Toolset for Simulation of Distributed Systems by Partial Orderings of Events", Aug. 29, 1996.
Perrochon, Louis, "Real Time Event Based Analysis of Complex Systems", perrochon.com, 1998.
Chandrasekaran, et al., "Telegraphcq: Continous Dataflow Processing for an Uncertain World", Proceedings of the 2003 CIDR Conference, 2003.
Luckham, David, "The Power of Events", Chapter 10, Addison-Wesley, 2002, ISBN 0-201-72789-7.
International Preliminary Report on Patentability for International Patent Application No. PCT/CA2008/000518, Mailed Oct. 1, 2009.
European Patent Office, Extended European Search Report for EP 08733622,8, Jan. 25, 2011.

METHOD AND SYSTEM FOR MONITORING MESSAGES PASSED OVER A NETWORK

FIELD OF THE INVENTION

This invention relates to the field of network message monitoring, and more specifically, to a method and system for monitoring messages passed over a network that relate to an application or a user interacting with an application.

BACKGROUND OF THE INVENTION

Businesses often need to monitor the transmission of application and other meaningful data on their networks in real-time. In many cases, it is only possible to monitor such information by monitoring the network itself. This can be the case when there is no way to access application data directly on the host computer or application server. Even where other types of monitoring is possible, network monitoring of application data has advantages over application server, client, and other types of monitoring for the following reasons. First, ease of integration. It is easier to do a "drop in" of new event collection and processing capabilities into an organization when no new software has to be installed on existing devices and new capabilities do not have to be installed on existing servers or integrated into existing server applications. Second, timeliness. The events collected are more timely since they are collected in the network rather than after the application has processed them. This timeliness allows for root cause analysis of performance issues in real-time as well as allowing for detection of otherwise difficult to detect timing problems. Third, completeness. An application problem may be caused by a network problem at any level of the Open Systems Interconnection ("OSI") Reference Model or stack (i.e., physical, data link, network, transport, session, etc.). Since business applications are being increasingly distributed over multiple servers, each performing a part of the application task, network monitoring becomes increasingly necessary to get a complete picture of the business application's operation. Fourth, localization. Network monitoring makes it easier to locate the source of important events in distributed systems and so identify application/business problems that are caused by network issues. Fifth, application independence. Network monitoring allows collection of data independently from the application. This allows the gathering of data in a way that cannot be compromised and so allows for reliable auditing of application level transactions.

One problem with performing message monitoring of applications via network monitoring is that application and other useful business data such as transaction performance is encapsulated in several layers of communications protocols as described in the OSI Reference Model or stack. For reference, FIG. 1 is a block diagram illustrating the seven-layer OSI Reference Model 100. The physical transmission protocol is typically at the bottom layer (i.e., layer 1), followed by link layer information (i.e., layer 2), then by network information (i.e., layer 3), etc., up to the application data (i.e., layer 7) which may itself consist of multiple levels. In addition, a selection of different protocols may be used at each of these levels. Hence, messages sent at any protocol layer do not stand on their own. Their meaning can only be determined when correlated with other semantic and contextual information such as acknowledgements, time outs, etc., associated with the specific protocol and all protocols lying below it. In addition, deriving meaning out of just the one protocol stack is often not enough. Many applications use multiple application protocols, for example, to transfer initialization information, management information, transactional data, etc. For the application to be fully monitored, the protocol stacks of all these related protocols must be fully decoded and correlated. The problem with existing methods and systems for monitoring application messages to gauge business application performance is that they do not effectively monitor the entire protocol stack of all related application messages and related network problems.

In particular, current methods and systems for monitoring messages interpret and correlate message data based on one of two types of software architectures. The first is a streams based architecture. This architecture relies on entire messages being passed from process to process with each process performing its own unique function. The second is an application programming interface ("API") based architecture. This architecture relies on data components within messages being passed between software functions via a set of APIs. However, both of these architectures have several disadvantages.

The disadvantages of the streams based architecture are as follows. First, data retention. To lower bandwidth requirements and increase simplicity, streams based systems currently drop lower level protocol data at each protocol level that the data is processed. Modules processing higher level protocol information do not have access to all lower level protocol information related to a message. Also, since there is typically no common storage place for contextual data, the context necessary for each level must be stored by the module responsible for that level. This information is not available to other modules. The result is that only localized decisions can be made as to where to route and how to process based on that layer's information. Second, scheduling. Streams based systems schedule by assigning priorities to messages as they start their flow through the system. Since the context of a given message is not known at this point and the state of the entire system cannot be easily determined, there is no way to prioritize the message based on this context, nor to change the priority of a message as it flows through the system. Third, flexibility. Steams based systems offer some modularity and so allow for some flexibility. However, since each module decodes, encodes, manages memory, etc., as does any full application, the modules are relatively complex even if the job they're doing is relatively small. The result is long development times and code which is often initially unstable. Fourth, processing requirements. Due to the necessity to decode incoming messages and encode outgoing messages within each module, streams based systems have a processing overhead that is above and beyond the actual processing required. If security is required, encryption and decryption must also be included. This extra work requires processing and greatly decreases the performance that may be obtained. Fifth, "downstream" status. With streams based systems, there is no inherent knowledge of the state of the intended destinations. The message is simply routed to various modules until it cannot be sent any further. An error message is then returned. As such, there is no way to "look ahead" and so terminate the message before all the processing has been done. Sixth, latency. Streams based systems have high latency as messages are assembled, transferred, and then disassembled at each hop. There is a large amount of protocol overhead as well to provide reliable data transfer. In addition to this, each message must typically be processed in turn to ensure the state of a message is consistent when a new module starts processing it. This means that messages cannot be processed concurrently, thereby increasing latency.

The disadvantages of the API based architecture are as follows. First, data retention. As with streams based systems, API based systems strip off lower level protocol data at each layer that the data is processed. This information is not available to other layers. The result is that only localized decisions can be made as to where to route and how to process based on that layer's information. Second, scheduling. API based systems typically schedule data on a first come, first served basis as this allows for linear program execution. This works well if all data is of the same priority (e.g., Internet traffic), but quickly falls apart in the presence of integrated services data such as video, voice, and data. Third, flexibility. API based systems generally lack the required dynamic flexibility as the code is "bound" into a particular execution stack at compile time.

A need therefore exists for an improved method and system for monitoring messages passed over a network. Accordingly, a solution that addresses, at least in part, the above and other shortcomings is desired.

SUMMARY OF THE INVENTION

According to one aspect of the invention, there is provided a method for performing a monitoring function for an application that passes messages between two or more endpoints, comprising: receiving a message including transaction data, the transaction data including data relating to transport of the transaction data; storing the message and transaction data in respective message data and transaction data buffers in a data store; storing status and semantic information associated with the message in the data store; receiving a signal selecting one or more module instances to define the monitoring function, each module instance for independently performing a respective aspect of the monitoring function, each module instance having related module instance data stored in a respective module instance data buffer in the data store, each module instance having a respective service access point for accessing the data store, each service access point having related service access point data stored in a respective service access point data buffer in the data store, each module instance independently accessing one or more of the message, transaction, module instance, and service access point data buffers to process data contained therein to perform its aspect of the monitoring function; and, initiating operation of the one or more module instances in accordance with a schedule defined by one or more routing rules, the one or more routing rules for routing a pointer to the message, as stored in the message data buffer, between the one or more module instances to thereby perform the monitoring function.

In the above method, the schedule may be further defined by a priority of the message and a priority of each of the one or more module instances. The one or more routing rules may act on one or more attributes of one or more of the message, transaction data, module instance data, and service access point data to define the schedule. The method may further include receiving a signal defining the one or more routing rules, the signal providing a selection of the one or more attributes and one or more operators for acting on the one or more attributes. The one or more routing rules may be stored in a database. The message may include a message generated by one or more of the one or more module instances. The one or more operators may be one or more Boolean operators. The method may further include receiving a signal configuring one or more respective properties of the one or more module instances. The application may be one or more of a business application and a real-time application. And, the signal for selecting the one or more module instances to define the monitoring function may be received through a user interface.

In accordance with further aspects of the present invention there is provided an apparatus such as a data processing system, a method for adapting this system, as well as articles of manufacture such as a computer readable medium having program instructions recorded thereon for practising the method of the invention.

BRIEF DESCRIPTION OF THE DRAWINGS

Further features and advantages of the embodiments of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENTS

Figure 1:
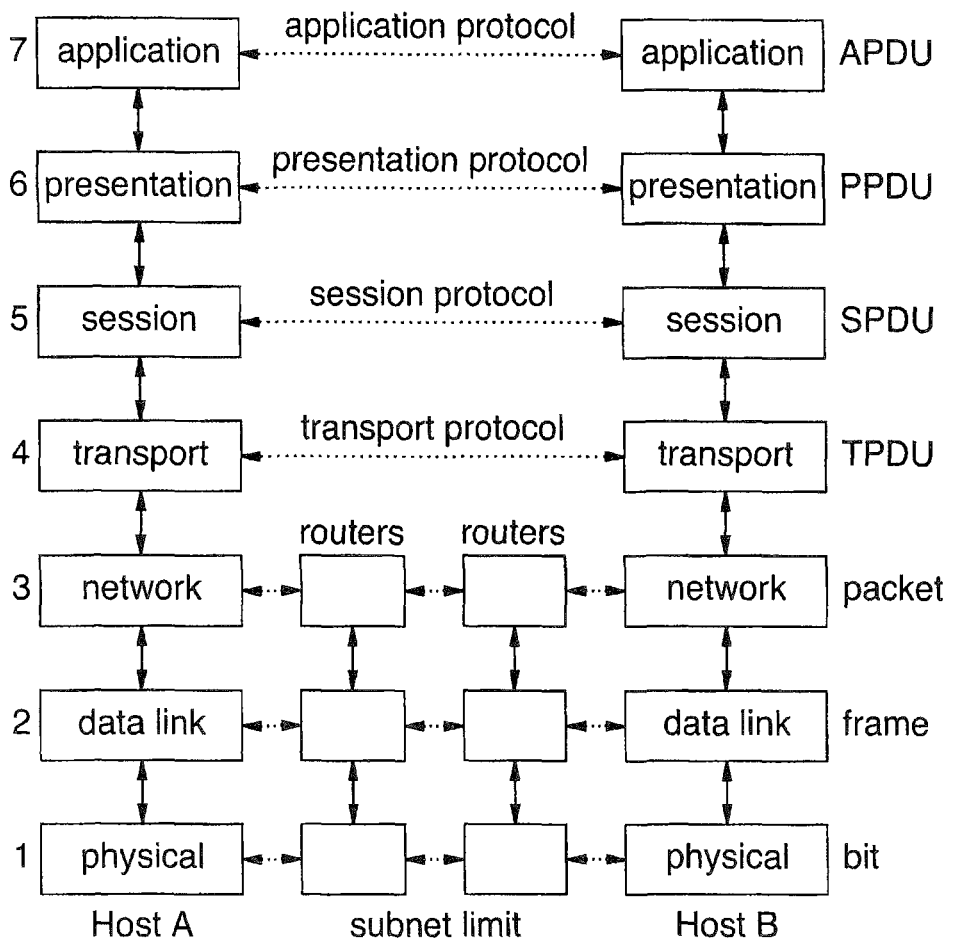
FIG. 1 is a block diagram illustrating the seven-layer OSI Reference Model.

In the following description, details are set forth to provide an understanding of the invention. In some instances, certain software, circuits, structures and techniques have not been described or shown in detail in order not to obscure the invention. The term "data processing system" is used herein to refer to any machine for processing data. The present invention may be implemented in any computer programming language provided that the operating system of the data processing system provides the facilities that may support the requirements of the present invention. Any limitations presented would be a result of a particular type of operating system or computer programming language and would not be a limitation of the present invention. The present invention may also be implemented in hardware.

The present invention provides a data centric message processing architecture for monitoring communications. Unlike other architectures, data messages along with their complete contexts reside in a common data store as opposed to being passed from process to process or from API to API. Dynamically linked, light-weight module instances (or light-weight modules) access this data store through a standard interface that allows them to read, write, modify, add, and delete specific fields in messages directed to them. Contextual information is also stored within the data store and can be referenced by any of the messages in the data store. Similarly, messages can be linked to other data stored within the data store (e.g., circuit information, transaction information, etc.). Finally, a real time, prioritized, rules-based scheduler examines the message data and decides which set of module instances the message and its associated contextual data will next be assigned to.

Thus, the present invention provides a method and system for uncovering network, application, and business level meaning in real-time from data packets and messages sent in any number of protocol layers. In general, a data packet is a protocol data unit sent as a contiguous frame over the network. A message may consist of one or more data packets. As mentioned above, communications protocols and the information passing over them is extremely diverse. Also, due to the hierarchical nature of communications protocols, each communications message contains a large amount of information spread over the stack of protocols that make up the message and the contextual information around it such as what circuit it is on, previous message flow, etc. The present invention provides for the acquiring, storing, manipulating, and retrieving of message information that may be used to provide information regarding the run-time performance of applications and the affect of network performance on the performance of these applications.

Embodiments of the present invention provide a real-time mechanism for acquiring (or creating internally), storing, manipulating, and retrieving message information for purposes such as application performance monitoring. The real-time mechanism has the following features. It is highly flexible due to the use of light-weight modules that can be concatenated together to form a complete system that is capable of monitoring any data flow. It provides a data store for storing the complete state of any communications and retrieving any portions of it by multiple modules without necessitating large data copies between modules. And, it provides a dynamic rules-based scheduler that allows for the routing between modules in a manner that ensures only applicable modules are activated and only at the appropriate times.

The light-weight modules provided by the present invention are independent software applets that can be connected together to form a complex operation. These applets do not require the complex configuration, start-up code, recovery code, etc., of a full application as that is done in the underlying system code. Unlike software functions or subroutines, they do not have to be connected by an overall connecting piece of software. Instead, the connection is done at run-time by the rules-based scheduler. The light-weight modules are concatenated together by a systems integrator (who may be the end user) by: (a) selecting the modules of interest; and, (b) defining paths between the modules that control of data will follow. Each one of the paths is defined by means of specifying a set of Boolean rules based on the data to be routed. Note that multiple rules at different priorities can be specified.

As mentioned above, most prior art systems use message passing or API mechanisms to pass entire messages from module to module. In contrast, the present invention saves the messages and any contextual information in a data store. Then, instead of the entire messages being passed (which requires continual encoding and decoding), only a pointer is passed giving the selected module control of that data. This allows for the amassing of large amounts of information about a message without the processing overheads and latencies of sending very large messages from point to point. The complete state of any communications message is stored by the data store. The complete state of a message includes packet layer information such as source and destination addresses, sequence numbers, protocol versions, etc. It also includes information such as when the message arrived, what port it came in on, what session/circuit it is part of, the current state of the transaction and session/circuit along with other relevant semantic information, what modules it has been routed through, what priority it is, etc. It can also contain information such as labels that have been added by modules to aid in downstream processing by other modules. The data store avoids large copies between modules by passing a pointer (or "buffer identifier") to the message instead of the message itself. A module may then use this buffer identifier as part of an address for looking at a particular piece of data in the message. For example, it might look at the "TimeReceived" field of the message with buffer identifier "678943". A light weight API provides protection between modules and the data store and allows modules to refer to particular fields by name.

The scheduler of the present invention passes control to applicable modules by: processing the routing rules that have been configured to determine which modules should be activated (i.e., which are "receiving" a message); determining the order of the activation depending on the priority set within the message; and, determining the order of the activation by the priority of the receiving module. Where the priority is equal, the modules are executed in round robin fashion. The scheduler decides which module gets the message and the order in which the modules getting messages are activated. It also activates the appropriate modules and ensures that they operate "sanely" within the system (i.e., don't take it over). What is actually routed is a pointer (i.e., the buffer identifier) rather than the entire message.

Figure 2:
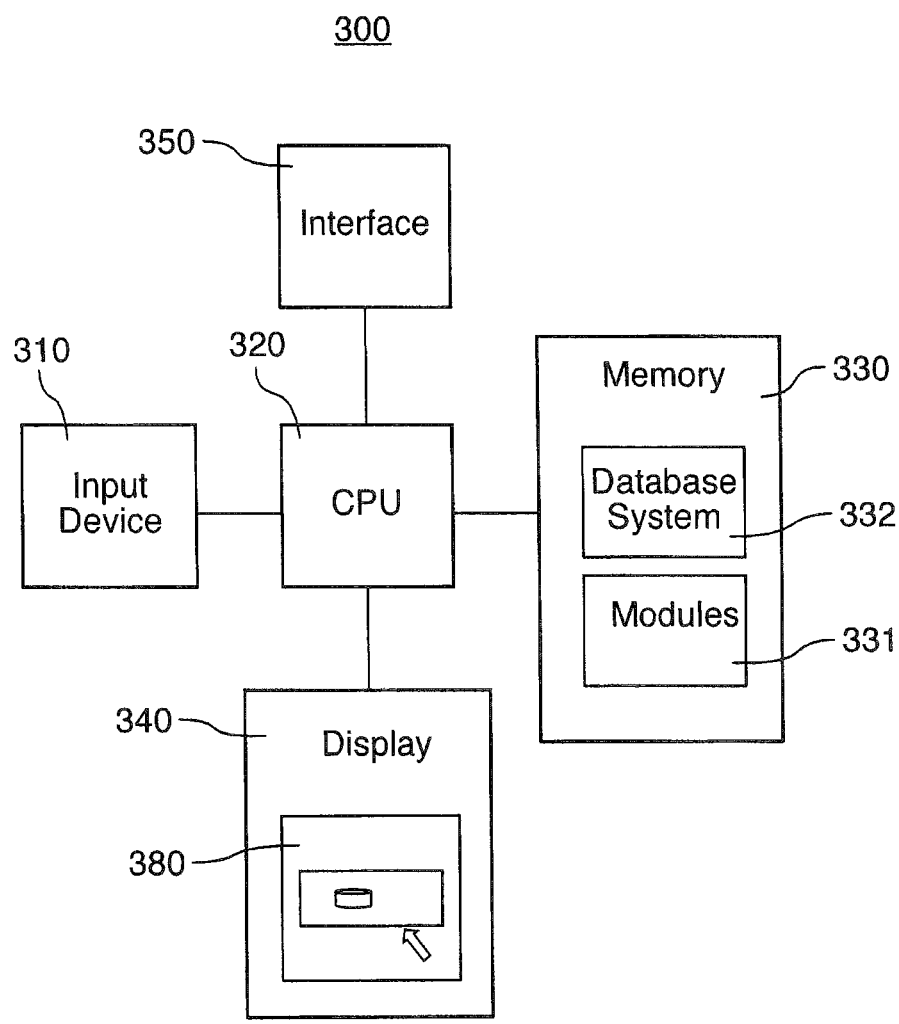
FIG. 2 is a block diagram illustrating a data processing system adapted to implement an embodiment of the invention.

FIG. 2 is a block diagram illustrating a data processing system 300 adapted to implement an embodiment of the invention. The data processing system 300 may be a server system or a personal computer ("PC") system and is suitable for operation as a network device. The data processing system 300 includes a central processing unit ("CPU") 320, memory 330, and an interface device 350 and may optionally include an input device 310 and a display 340. The CPU 320 may include dedicated coprocessors and memory devices. The CPU 320 is operatively coupled to memory 330 which stores an operating system (not shown) for general management of the system 300, executable code for the system, configuration information, data stores, etc. The memory 330 may include RAM, ROM, disk devices, flash memory, etc. The memory 330 may include a variety of storage devices including internal memory and external mass storage typically arranged in a hierarchy of storage as understood to those skilled in the art. The interface device 350 may include one or more connections including local area network connections, dial network connections, wireless network connections, file system connections, database connections, messaging connections, operating system "pipe" connections, connections via shared memory, etc. The data processing system 300 is adapted for communicating with other data processing systems (not shown) over a network (not shown) via the interface device 350. The input device 310 may include a keyboard, a mouse, a trackball, or a similar device. The display 340 may include a computer screen, terminal device, or a hardcopy producing output device such as a printer or plotter. The CPU 320 of the system 300 is typically coupled to one or more input devices 310 for receiving user commands or queries and for displaying the results of these commands or queries to the user on the display 340. Commands and queries may also be received over a network connection, and results may be transmitted over a network connection. The data processing system 300 may include a database system 332 for storing data and programming information. The database system 332 may include a database management system ("DBMS") and a database and may be stored in the memory 330 of the data processing system 300. The data processing system 300 has stored therein data representing sequences of instructions which when executed cause the method described herein to be performed. Of course, the data processing system 300 may contain additional software and hardware a description of which is not necessary for understanding the invention.

Thus, the data processing system 300 includes computer executable programmed instructions for directing the system 300 to implement the embodiments of the present invention. The programmed instructions may be embodied in one or more hardware modules (not shown) or software modules 331 resident in the memory 330 of the data processing system 300. Alternatively, the programmed instructions may be embodied on a computer readable medium (such as a CD disk, flash memory, or floppy disk) which may be used for transporting the programmed instructions to the memory 330 of the data processing system 300. Alternatively, the programmed instructions may be embedded in a computer-readable signal or signal-bearing medium that is uploaded to a network by a vendor or supplier of the programmed instructions, and this signal or signal-bearing medium may be downloaded through an interface (e.g., 350) to the data processing system 300 from the network by end users or potential buyers.

Optionally, a user may interact with the data processing system 300 and its hardware and software modules 331 using a user interface ("UI") 380. The UI 380 may be used for monitoring, managing, and accessing the data processing system 300. UIs are supported by common operating systems and provide a format which enables a user to choose commands, execute application programs, manage computer files, and perform other functions selected from a menu through use of an input or pointing device such as a keyboard or mouse 310 or by entering a command.

Figure 3:
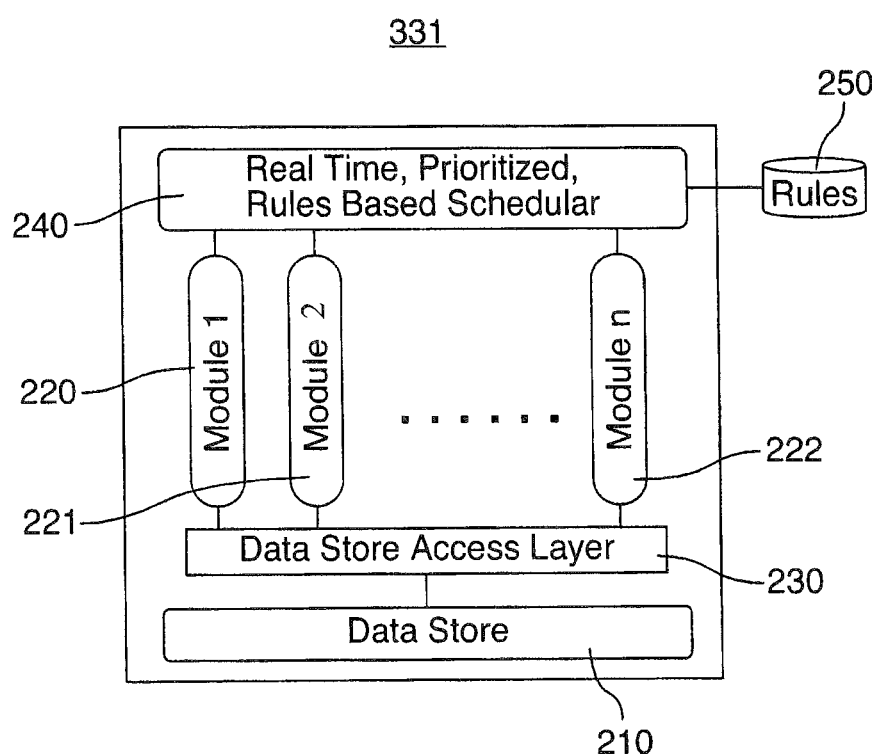
FIG. 3 is a block diagram illustrating the architectural relationship between selected software modules of the system in accordance with an embodiment of the invention.

FIG. 3 is a block diagram illustrating the architectural relationship between selected software modules 331 of the system 300 in accordance with an embodiment of the invention. The selected software modules 331 include the following: a common data store 210 in which all messages and related contextual information received through the interface 350 are stored; light-weight module instances 220, 221, 222 that can be dynamically inserted and deleted from the system while the system is running; a data store interface or middleware layer 230 that separates the data store 210 from the module instances 220, 221, 222 and allows them to access data fields directly; and, a real-time, rules-based scheduler 240 that schedules specific module instances (e.g., 220) with specific messages. The rules 250 for the rules-based scheduler 240 may be stored in a rules database 250. In general, a data field is a single data element within a message data buffer. Each data field consists of a name, a set of attributes containing such information as the type of data and its length, and the data value itself.

In general, a light-weight module is a component of executable code that provides a specific service or performs a specific function on one or more data fields in the data store 210. The system 300 allows multiple instances of a module to be simultaneously active within it. Light-weight modules may interface to external interfaces (e.g., interface modules), implement protocols (e.g., protocol and transport modules), operate on the contents of a message (e.g., message modules), operate on complete transactions (e.g., transaction modules), implement other networking tasks (e.g., network management and helper modules), implement an application task (e.g., application module), or perform any other function relating to information within the data store 210. In general, a module instance 220, 221, 222 is a copy of a light-weight module. The system 300 allows multiple copies of any module to be active at any time within the system. This is accomplished by assigning different module instance "names" to the different instantiations of the module. Thus, a module can be thought of as a piece of code while a module instance can be though of as an instantiation of a module within the system 300. The module instance capability of the system 300 reduces both the configuration and implementation complexity of a module.

The data store 210 contains all messages and related contextual information. It also contains all accessible information about the state of the module instances 220, 221, 222 including statistical information, status, and operational characteristics such as how long each module instance has been active. An advantage of this data centric approach is that data does not have to be encoded and decoded many times as it sent from module instance (e.g., 220) to module instance (e.g., 221). Only control of message processing needs to be passed. Another advantage is that it makes management very easy as distinct, independent module instances 220, 221, 222 can be developed that get the required message data, message context, module instance status, and module instance statistics information directly from the data store 210 as opposed to coding such functionality into the core system as is typically done in prior systems. Finally, this approach greatly increases the ability to add future enhancements to the system 300 by allowing the modules to process messages concurrently resulting in lower overall latency.

Figure 4:
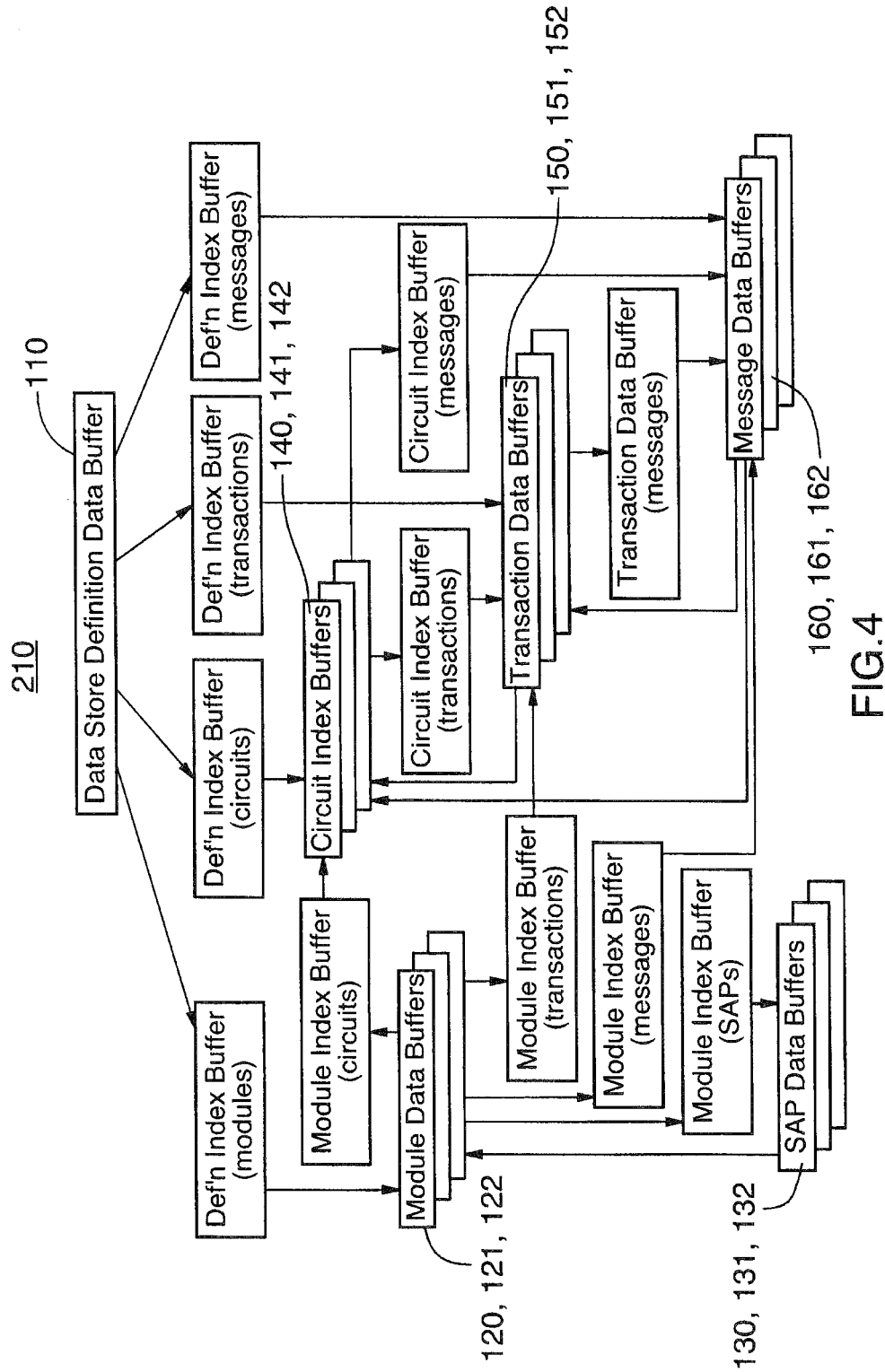
FIG. 4 is a block diagram illustrating the structure of a data store in accordance with an embodiment of the invention.

FIG. 4 is a block diagram illustrating the structure of the data store 210 in accordance with an embodiment of the invention. The fundamental data structure used by the data store 210 is the memory buffer. Memory buffers exist in a data buffer pool that provides a repository for all data in a structured format. In general, memory buffers may be created out of data blocks and other low level data structures. Each memory buffer is accessed through a respective "buffer identifier". A buffer identifier is unique across the entire data store 210. The goal of the data buffer pool is to provide a quick and efficient method for storing, retrieving, and modifying data. A large part of this efficiency comes from the ability to read and write groups of fields in a single operation as opposed to having to read and write each field individually.

Two types of memory buffers exist in the data store 210. The first is used to store actual module instance information, messages, transactions, circuits, etc. These are called "data buffers". According to one embodiment, data buffers store information in named and typed attribute fields consisting of the field name, the field type and certain other low level attribute information pertinent to the field, and the field value.

A second type of memory buffer, called "index buffers", is used when it is necessary for a data buffer to refer to a group of related data buffers. For example, a message may be part of a "transaction" and the transaction may be part of a "circuit". In this case, index buffers are used to link the message to the appropriate transaction and circuit data buffers. In general, index buffers are simpler than data buffers. The only information stored within them are "buffer identifiers" that refer to other buffers. In general, a transaction is a sequence of associated messages comprising a single higher level action (e.g., transferring funds, verifying credit, etc.). It is possible for more than one transaction to occur in the lifetime of a circuit. A circuit, in general, is a virtual data path over a computer network that persists for some period of time and over which data may flow. Circuits are typically established by call connect requests although they may also be established implicitly by incoming messages in the case of connectionless protocols. A circuit may handle one or more transactions, or alternatively, data flow may occur on circuits without there being a defined transaction.

Data buffers may refer to other data buffers and to index buffers (i.e., data buffers can contain fields that may be either buffer identifiers for other data buffers or index buffers). FIG. 4 illustrates this relationship and also shows how the different types of data buffers and index buffers are interrelated. In FIG. 4, index buffers are shown in dashed-lined boxes while data buffers are shown in solid-lined boxes.

As shown in FIG. 4, there are three different types of data buffers. The primary one, the data store definition data buffer 110, acts as a "super block". That is, it maintains a list of all available and all used buffers. When a buffer is freed up, its buffer identifier is added to a "free list" in the data store definition data buffer 110. When a buffer is required, the buffer identifier pointing to it is removed from the "free list" and the memory within the buffer can then be used for storage. Thus, the data store definition data buffer 110 contains information regarding the allocation of memory buffers within the data store 210. In general, there is only one data store definition data buffer 110 per data store 210.

Module instance data buffers 120, 121, 122 and Service Access Point ("SAP") data buffers 130, 131, 132 are used by the module instances 220, 221, 222 themselves. Each module instance (e.g., 220) has exactly one module instance data buffer (e.g., 120) where it keeps information concerning the module instance 220 such as when it was last initiated, when configuration was last changed, and other statistics and status information. Along with the module instance data buffer 120, each module instance 220 has exactly one SAP data buffer (e.g., 130) for each SAP supported by the module instance 220. SAPs are access points to the module instance 220. As such, there are usually SAPs for incoming and outgoing data, for alerts, and for network management. SAPs may be incoming only, outgoing only, or bidirectional. SAP data buffers are linked to the module data buffer for the associated module instance and contain all information regarding the SAP including status and statistical information.

The third type of data buffer pertains to the data itself. These are circuit data buffers 140, 141, 142, transaction data buffers 150, 151, 152, and message data buffers 160, 161, 162. Circuit data buffers 140, 141, 142 contain any information regarding virtual circuits that have been established. In particular, circuit data buffers 140, 141, 142 contain all the information regarding the circuit itself including contextual information (e.g., addressing information, statistics, status, etc.) and the handling of transactions and messages within the circuit. Transaction data buffers 150, 151, 152 contain any information about transactions. In particular, transaction data buffers 150, 151, 152 contain information regarding the transaction itself and about the handling of messages for the transaction (e.g., lifetime, priority, etc.). Note that circuits may be embedded (i.e., a circuit may exist within a circuit) and transactions may be embedded (i.e., a transaction may exist within a transaction). A transaction data buffer 150, 151, 152 may be deleted by a module instance or, when it's lifetime expires, by the system 300. Message data buffers 160, 161, 162 contain information regarding the messages that make up a transaction. In particular, message data buffers 160, 161, 162 contain information regarding the message including the message itself and any decoded contents. A message data buffer 160, 161, 162 may be deleted by a module instance or, when it's lifetime expires, by the system 300. Note that it is normal for multiple message data buffers 160, 161, 162 to point to one transaction data buffer (e.g., 150), and for multiple transaction data buffers 150, 151, 152 to point to one circuit data buffer (e.g., 140). Note that it is also possible for one or more transaction data buffers (e.g., 150) to point to another transaction data buffer and for one circuit to point to another in a hierarchical manner. However, in some instances, such as in pure message passing applications, transaction data buffers 150, 151, 152 and/or circuit data buffers 140, 141, 142 may not be required.

Referring to FIGS. 3 and 4, light-weight modules 220, 221, 222 are the building blocks of any application using the system. Multiple instantiations of a module can exist within a system (i.e., multiple module instances of a module), each with its own unique name and configuration. This allows using a module multiple times at different points in a message flow. The primary function of module instances 220, 221, 222 is to process data buffers which are generally message data buffers 160, 161, 162, transaction data buffers 150, 151, 152, or circuit data buffers 140, 141, 142, but may also be module data buffers 120, 121, 122 or SAP data buffers 130, 131, 132. Module instances 220, 221, 222 can be dynamically inserted and deleted from the system 300 without affecting its operation.

Each module instance (e.g., 220) has one or more endpoints called Service Access Points ("SAPs"). The configuration of SAPs is determined by the current module instance configuration (i.e., as determined by a system administrator and stored in an extensible mark-up language ("XML") document where the system's configuration component can access it and pass the results on to the appropriate module instance for execution). Once all the module instances 220, 221, 222 are configured and routing entries have been made, control of messages and their associated context may be passed between module instances 220, 221, 222 via the SAPs. For higher performance, module instances 220, 221, 222 may be dynamically linked into the core system as opposed to being separate processes. Such an implementation, while not necessary, allows the system to avoid the latencies inherent in processing context switches. In general, a SAP is a service point (e.g., socket) within a module instance to which messages can be assigned or from which messages are reported to the scheduler 240. Each module instance typically has SAPs (e.g., for terminal end connectivity, host end connectivity, management, diagnostics, etc.). SAPs may be data originators, data terminators, or both data originators and terminators.

Referring to FIG. 3, the data store interface 230 is a code layer that separates the data store 210 from the module instances 220, 221, 222. It protects the data store 210 from raw access by the module instances 220, 221, 222 and provides the module developer with a simple and consistent message and field oriented API to the data store 210. This API supports the following capabilities: access message; create message; link message; clone message; delete message; set message lifetime; access field; create field; delete field; modify field; and, get field attributes. This small set of core capabilities ensures the system's high performance as compared to other prior systems.

The real-time, rules-based scheduler 240 is a core component of the system 300. The scheduler 240 performs the following functions: it prioritizes the processing of messages; and, it governs the routing of messages between module instance SAPs. Prioritizing is performed by passing control to module instances 220, 221, 222 based on the priority of the message being passed, the contents of the message, and the priority of the module instance itself. A message may encounter matches to multiple rules at a particular priority level. In this case, the message will be assigned to multiple module instances 220, 221, 222 concurrently, which is an advantage of the system. Once a match is made at a particular priority level, no lower level priority rules are examined.

The scheduler 240 is activated upon occurrence of any of the following three types of events: the arrival of a message requiring routing; the expiry of a timer; and, management events such as a change in the rules configuration, a change in a module instance's configuration, or a change in the core system's configuration (e.g., which module instances are active within a module).

Routing of messages is accomplished by the execution of a user configured set of logic rules 250 that act on the message and related contextual data. These messages may represent circuits (e.g., virtual connections), transactions, data messages, or any other data buffer contained in the data store 210 plus any associated context. Messages can be sent to multiple SAPs on multiple module instances 220, 221, 222 simultaneously. In no case is the scheduler 240 either an originator or a terminator of messages; it does not encode, decode, or otherwise modify messages. It just assigns them to different module instances 220, 221, 222 for processing.

The scheduler's 240 rules-based language provides a simple and intuitive description of how message routing is to take place through the system 300. As mentioned, the rules 250 for the scheduler 240 may be stored in a rules database 250. The following operators are supported by the rules-based language (note that either a symbol or an abbreviated notation may be used within rules statements): Equal to; Not equal to; Less than; Less than or equal to; Greater than; Greater than or equal to; Or; And; Logical not; Add; Subtract (or minus); Multiply; Divide; and, Other special operators such as: "CONT" (Logic continues on next line); "REM" (Comment from here to end of line); "( )" (Establishes precedence of the Boolean operation); and, "::" (Assigns an execution level to the Boolean statement). Thus, in general, a rule 250 is a Boolean specification of what messages are to be routed, where they are to be routed to (i.e., what module instances and SAPs), and the priority of the rule. Rules 250 may define sequential and parallel events and include the handling of timers as well as data triggered events.

Figure 5:
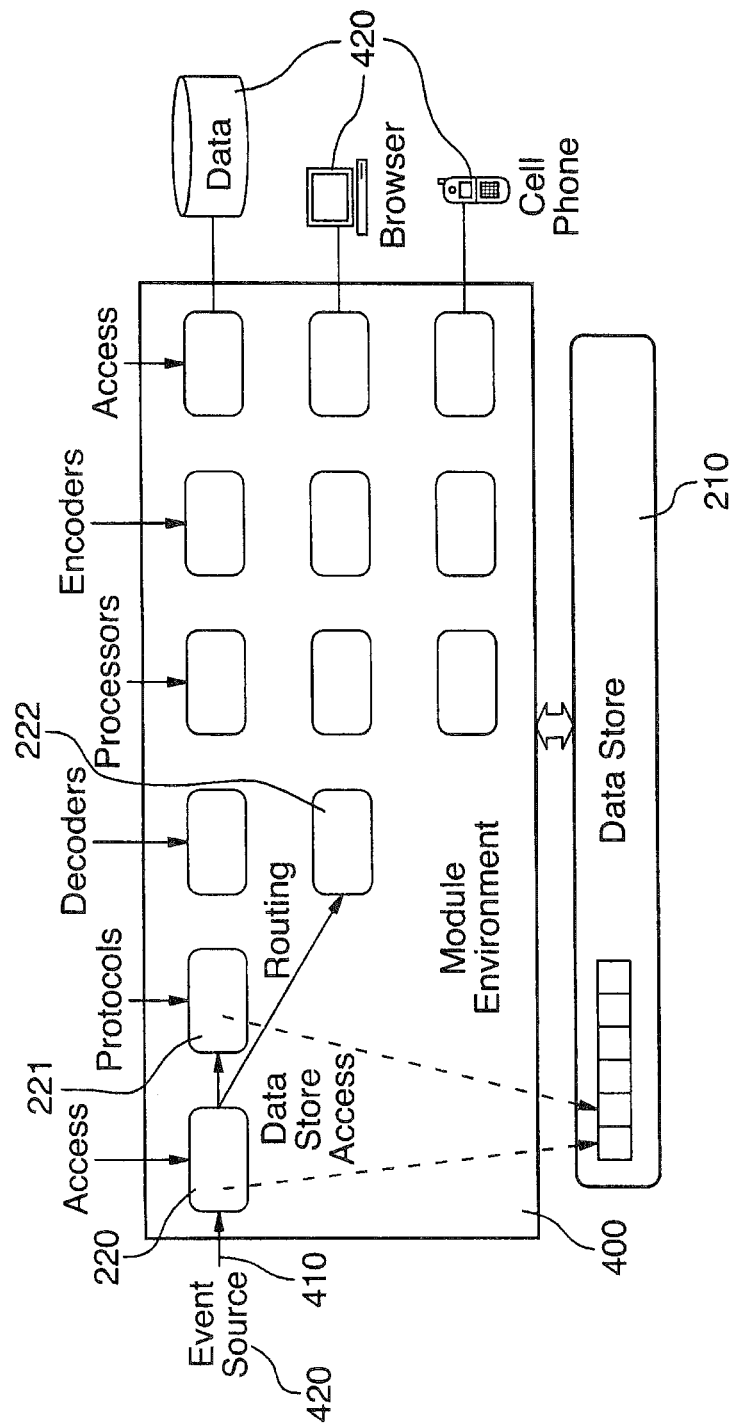
FIG. 5 is a block diagram illustrating data flows through an exemplary module environment within the system for an application in accordance with an embodiment of the invention.

FIG. 5 is a block diagram illustrating data flows through an exemplary module environment 400 within the system 300 for an application in accordance with an embodiment of the invention. Messages 410 from various "event sources" 420 enter the system 300 through a module instance (e.g., 220) that acts as an interface to the outside world. In general, a message 410 is a contiguous stream of data comprising one part of a transaction and/or its associated protocols and may consist of one or more data packets. Messages may also be created internally by modules which are reading files, accessing databases, or otherwise acquiring data from external sources. Many types of "access" modules may be provided. Some examples include ones that connect to local area networks, dial networks, wireless networks, etc., and also ones that connect to operating system capabilities such as file system connections, database connections, messaging connections, operating system "pipe" connections, connections via shared memory, etc.

Once received, the messages 410 are stored in the data store 210 along with related contextual information such as what physical port it came in on, addressing information, the time of arrival, an assigned priority, etc. In addition to storing messages, the module instance 220 may also perform protocol actions with the outside world such as sending back acknowledgements.

When the access module instance 220 has finished receiving the message 410 and performing related activities, the scheduler 240 is activated. The scheduler 240, as will be described in more detail below, determines which module instances 221, 222 are to be assigned the message 410 next. The scheduler 240 then invokes the appropriate module instances 221, 222 supplying the buffer identifier for the message 410.

In this way, control of the message 410 is passed from module instance (e.g., 220) to module instance (e.g., 221, 222). Each module instance (e.g., 220, 221, 222) may use any data in the message 410, may further decode the message, or may encode additional elements in the message 410. Thus, as the message 410 proceeds from module instance 220 to module instance 221, 222, it's context may be continually refined.

The rules-based scheduler 240 provides the intelligence required to move message references 410 between module instances 220, 221, 222. It is a real-time, prioritized scheduler 240 that executes tasks at any priority level in a round-robin fashion.

The scheduler 240 applies user configured Boolean logic rules 250 to the message 410 and its contents to determine which module instances 220, 221, 222 are to be assigned the message 410 next (i.e., to generate a schedule). Note that a message 410 may be assigned to multiple module instances simultaneously (e.g., 221 and 222 in FIG. 5). Thus, the scheduler 240 includes a "multi-cast" or "fork" function as well as a routing function.

Figure 6:
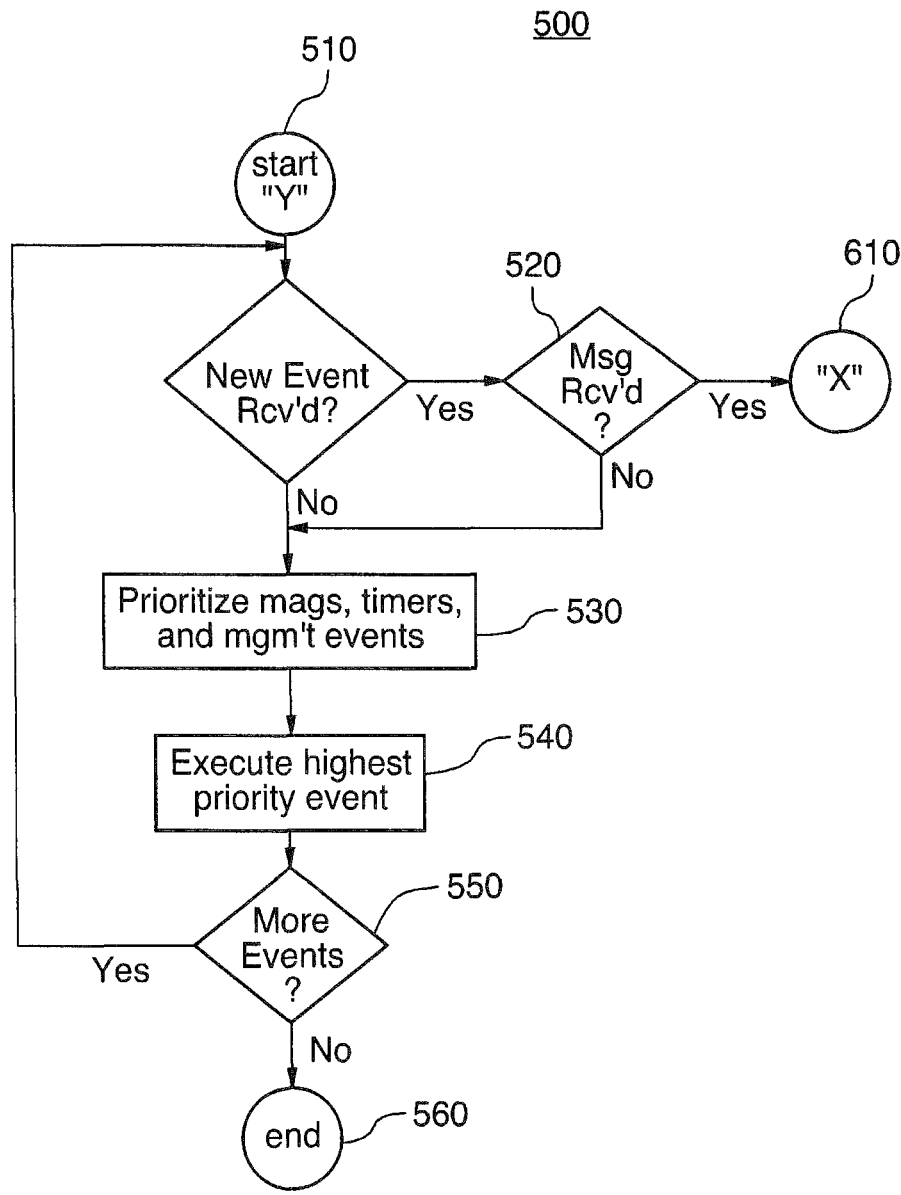
FIGS. 6 and 7 are data flow diagrams illustrating the operation of a scheduler in accordance with an embodiment of the invention.
Figure 7:
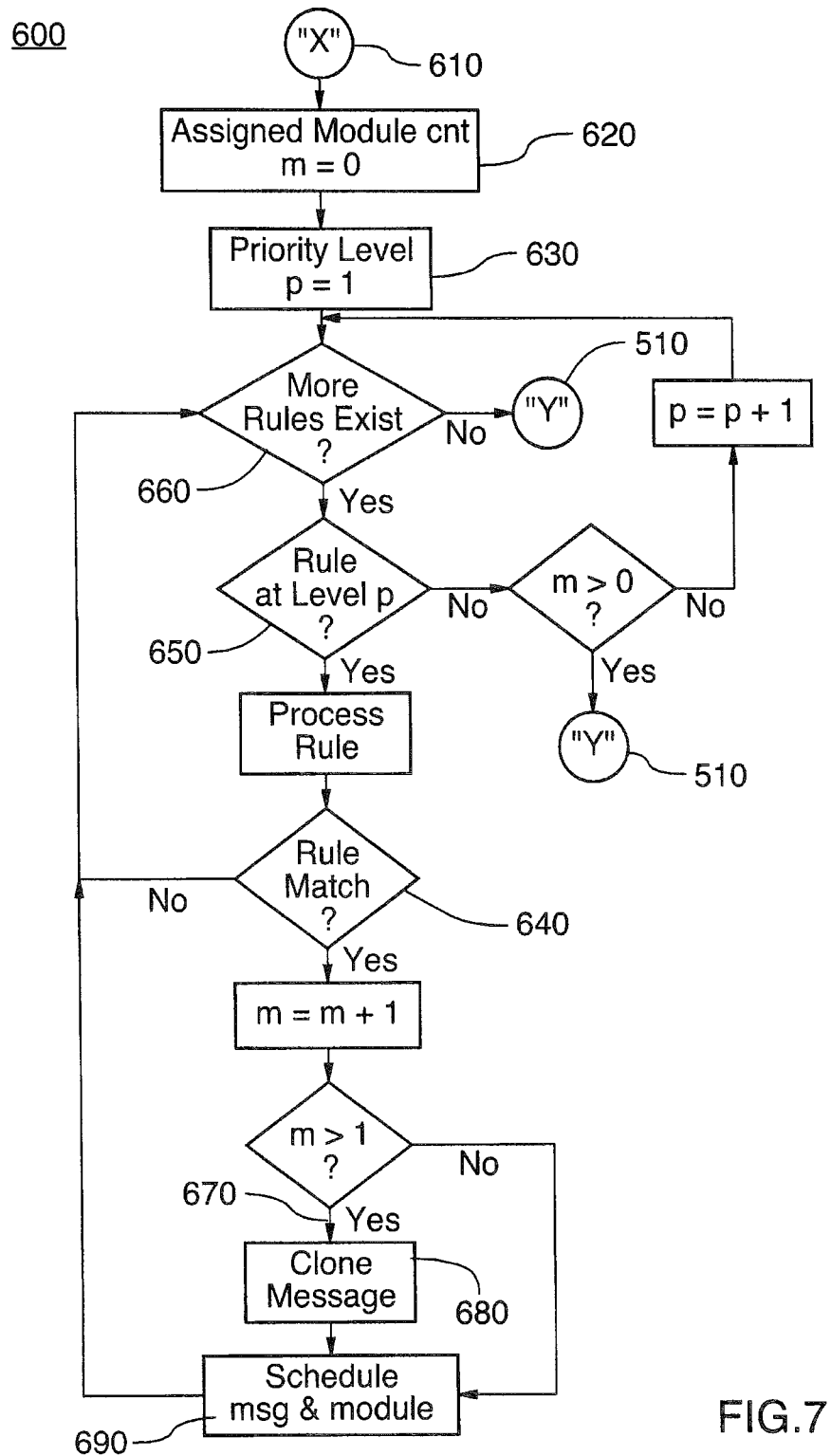

FIGS. 6 and 7 are data flow diagrams illustrating operations 500, 600 of the scheduler 240 in accordance with an embodiment of the invention. Referring to FIG. 6, when operations "Y" 500 are invoked 510, the scheduler 240 checks 520 whether it has been invoked by a message event, a timing event, or an internal management event typically sent by a module instance. If the event is a message type, than the scheduler 240 invokes 610 operations "X" 600 as shown in FIG. 7. If the event is the expiration of a timer or a internal management event, a prioritization of all events is performed 530, the highest priority event is executed 540, and (once all events have been satisfied 550), the scheduler 240 terminates 560.

As mentioned, if the scheduler 240 has been invoked by a message event, then operations "X" 600 are executed 610. The first step 620 is to zero the number of modules the message (e.g., 410) is assigned to ("m"). The reason for this is that a message 410 may be assigned to more than one module (e.g., the scheduler 240 may perform a forking operation as shown in FIG. 5). The scheduler 240 than walks through the priority levels ("p") starting with priority level "1" (the highest priority) looking for a rule 250 that matches 640 with the message 410. If a matching rule 250 is found at a priority level, no lower priority levels will be examined. If a matching rule is not found, then a check 650 is made at the next lower priority level until 660 all rules 250 have been examined or a match has been found.

If there are multiple matching rules 250 at a given priority level, the message 410 will be sent to all the module instances for which the rule was satisfied. If the count (m) of the number of module instances the message is assigned to is greater than "1" 670, than a potential problem occurs as each module instance may modify the message 410, possibly resulting in simultaneous changes to the message 410 or its context along different message "paths". The system 300 avoids this problem by having the scheduler 240 clone 680 a message 410 when it is assigned to more than one concurrent module instance in any single invocation of the scheduler 240.

Once the scheduler 240 has assigned 690 the messages 410 to the appropriate module instances, it invokes those module instances by executing 540 the events in priority order as per the operations 500 of FIG. 6. This may involve reading parts of the message data or its context, inserting or deleting message or message context attributes, creating new messages, or deleting the message 410 entirely. The insertion of message or message context attributes may involve decoding the next layer of the message, encoding part of it into a new message fragment, adding additional contextual information, etc. (see FIG. 5).

When the processing of a module instance (e.g., 221 in FIG. 5) is completed, the scheduler 240 is again invoked 510 and the whole process is repeated. In this way, a message 410 may be incrementally decoded, encoded, or otherwise processed as it passes through the system 300, 400. The fact that each module instance 220, 221, 222 has complete visibility to all message contextual information means that processing at any point in the path can make use of any combination of lower and higher layer protocol information in ways that is not possible with existing data communications software architectures.

The present invention may be used for real-time network management, transaction monitoring, data switching, sensor monitoring, and process control applications although it is just as useful in non-real time applications. The following are some illustrative examples of the use of the present invention.

First, the present invention may be used for real-time transaction health and business process monitoring. The present invention may be used to monitor and decode all layers of the OSI stack 100. In this case, data may be correlated into transactions. The results from the transactions (i.e., type of failure, success, etc.) may then be encoded and output to databases, log files, and the Web. Further correlation may be performed to create exception reports which can be transmitted to specific destinations via "syslog", simple network management protocol ("SNMP"), remote authentication dial-in user service ("Radius"), short message service ("SMS"), simple mail transfer protocol ("SMTP"), etc. Real-time control messages may also be created and fed back to control the monitored system.

Second, the present invention may be used for billing. The present invention may be used to monitor network traffic and decode all aspects of it. The outputs may then be correlated with billing policies to create billing records which may then be encoded and output to databases, log files, the web (i.e., for real time viewing), etc.

Third, the present invention may be used for climate monitoring. The invention may be used to collect data from a large variety of sensors, to correlate the data, perform statistical analysis on it (i.e., max, min, histogram, standard deviation, etc.), and then encode the results and deliver them to appropriate destinations in appropriate formats.

Fourth, the present invention may be used as a network datascope. The invention may be used to monitor network traffic, decode it, process it based on various trigger events, and then output the results to appropriate destinations in appropriate formats.

Fifth, the present invention may be used as a context-based message router. The invention allows for the switching of application data to different locations based on the application message contents as well as lower level addressing and protocol information. Context sensitive switching of legacy, XML, and other message types can be supported in this way.

Sixth, the present invention may be used for fraud detection. The invention may be used to intercept network data and send a copy of all or part of it to a fraud analysis application for approval before the actual transaction is forwarded to the end application. This use of the invention is of particular value in cases where extra fraud prevention data, such as biometrics, is attached to the payload of the message.

Seventh, the present invention may be used as an intercept controller. The invention, when combined with physical network intercept hardware, may be used to receive the data directed between two endpoints, decode it, correlate it into higher level "derived events", and then either forward it directly to the destination or send it to an intercept processor depending on the status of the intercept processor. Data from the intercept processor may likewise be decoded and processed. If the intercept processor fails for any reason, the intercept controller may recover in real-time by noting which data was not forwarded to an endpoint and then taking over that transmission directly. This particular application of the invention is described in more detail below.

Figure 8:
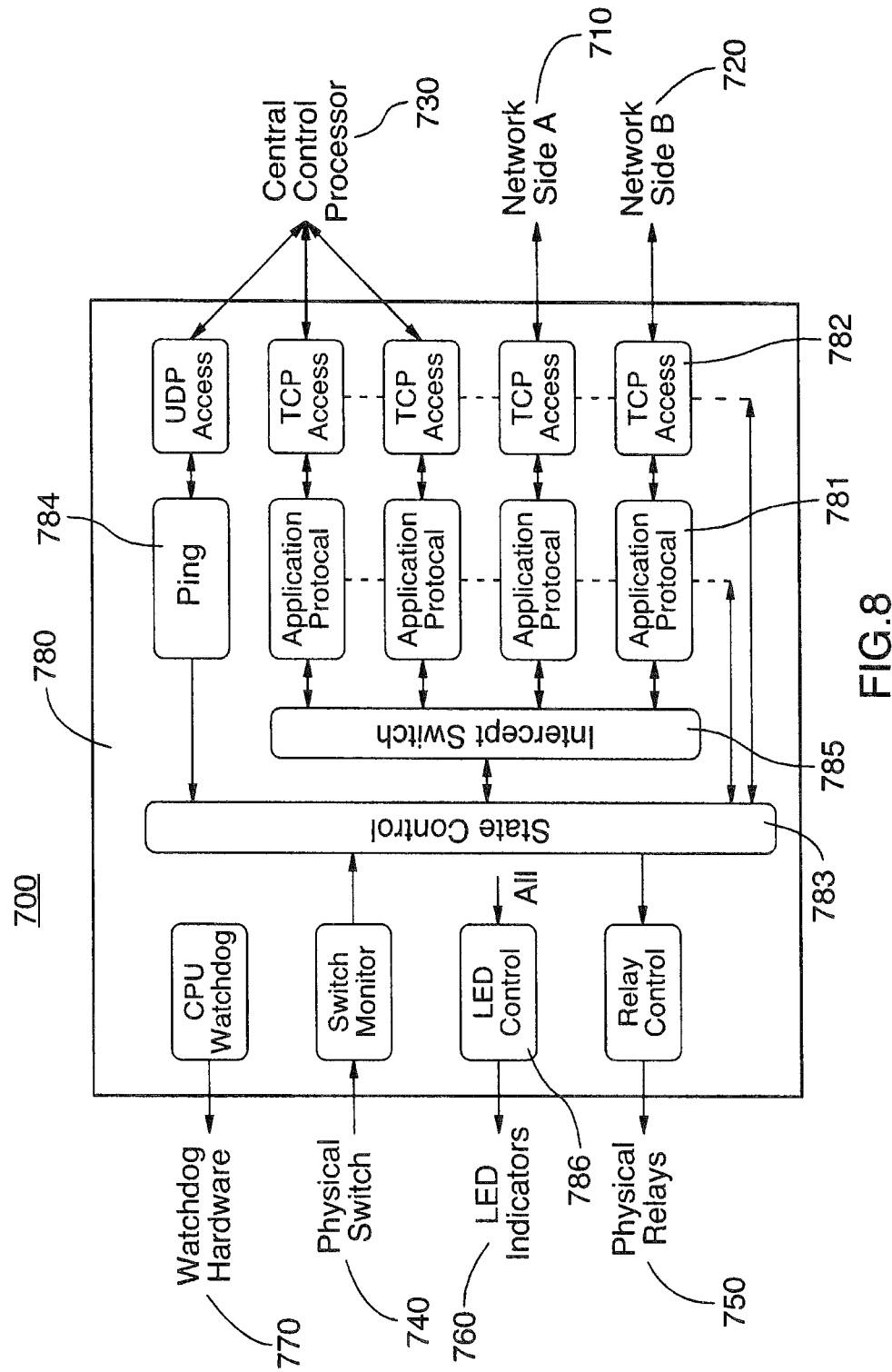
FIG. 8 is a block diagram illustrating an exemplary intercept controller system in accordance with an embodiment of the invention; and, FIG. 9 is a flow chart illustrating operations of modules within the memory of a data processing system for performing a monitoring function for an application that passes messages between two or more endpoints, in accordance with an embodiment of the invention.

FIG. 8 is a block diagram illustrating an exemplary intercept controller system 700 in accordance with an embodiment of the invention. One of the tasks that is often encountered in real-time networks is the ability to intercept and modify data as it passes between endpoints (e.g., between a server computer and a remote device being controlled). The present invention may be used to perform this task as will be described with reference to FIG. 8 in the following.

The intercept controller system 700 includes three LAN interfaces, two primary interfaces 710, 720 for each side of the network and a secondary interface 730 for connecting to a central monitoring and control processor. The system 700 also includes a physical switch 740 which controls whether data traffic is to be "relayed" physically between the primary LAN interfaces 710, 720, "bypassed" through the system without being sent 730 to the monitoring/control processor, or "intercepted" by sending 730 it only to the monitoring/control processor. This mode of operation can also be selected automatically by the system's software depending on the state of the different connections 710, 720, 730. Other hardware components of the system include physical relays 750 responsible for either connecting the two primary LAN interfaces 710, 720 directly together or terminating them within the system 700, light emitting diodes ("LEDs") 760 for displaying the status of the system 700, and a CPU hardware watchdog timer 770 used to reinitialize the system should a software failure occur.

FIG. 8 also illustrates the primary modules instances 780 and message flow within the system 700. Note that a number (i.e., 4) of instances 781, 782 of the "Application Protocol" and "TCP Access" modules exist. These simplify the configuration of the system 700.

In this system 700, the "State Control" module instance 783 is a general purpose module with state tables specific to the operation of the system 700. This module instance "listens" to events from other module instances (i.e., from "Ping" 784, "Intercept Switch" 785, and all instances of "TCP Access" and the "Application Protocol" module instances 781, 782). After examining its state tables, the State Control module instance 783 acts on those events by creating and sending control messages to other modules. The "Intercept Switch" module instance 785 is responsible for passing messages directly between the network interfaces 710, 720 or, when requested by the "State Control" module instance 783, passing data 730 to the control processor. The "Ping" module instance 784 is simply responsible for determining if the control processor is active. The other module instances shown in FIG. 8 are self explanatory. Although not shown in detail in FIG. 8, the "LED Control" module instance 786 listens to messages from all modules and uses this information plus its configuration information to light up the appropriate LEDs 760 mounted on a front panel (not shown) of the system 700.

Even in this simple exemplary system 700, there are a fairly large number of module instances 780. This does not impose significant overhead in this case since there is no operating system context switch involved in message assignment to module instances 780 as they all run as part of a single process and most module instances only examine a small component of any message. According to one embodiment, context switches may be provided for protection of kernel and data stores. The high degree of modularity allows for the creation of standard modules which can be used in many different applications. It is this modularity combined with the rules-based scheduler 240 that gives the system 700 increased flexibility. As described above, message routing is controlled by logical rules 250 using a data routing language. The rules describe just what messages will be assigned to what module instances 780 and when. In the system 700 of FIG. 8, protocol control messages such as "connects" and "clears" are routed along a message channel (i.e., towards the "Intercept Switch" module instance 785 for incoming messages and towards one of the "TCP Access" module instances 782 for outgoing messages), to the "State Control" module instance 783, and to the "LED Control" module instance 786.

As described above, all message context (including the complete message history) is stored within the data store 210. Messages may be associated with a transaction and/or a network circuit. Multiple messages can, as one would expect, be part of one transaction. Likewise, multiple messages (and transactions) can be part of one network circuit. Less obviously, a message may also be part of multiple transactions or circuits. This is a necessary capability as messages may belong to a different transactions (or circuits) on each network interface 710, 720.

The present invention provides for the following capabilities that are required for a reliable message and application monitoring system. First, data retention. Low level information (i.e., when the message arrived, what physical port it came in on, what the network addresses were, the circuit identifier, the time of arrival, etc.) must be retained in order to correctly route the message to its intended application, to make security related decisions, and to ensure that service level objectives are being met. Often these decisions can only be made correctly by examining simultaneously data that spans the entire OSI hierarchy. Second, scheduling. In networks where integrated real-time data, voice, video, and other services are becoming increasingly common, it is vital to be able to schedule messages based on real-time quality of service ("QoS") requirements. To do this, the underlying technology must allow real-time, prioritized scheduling of data messages. This means that it must be possible to know, and be able to control, at any time the state of the entire system and all messages within it. Third, flexibility. The rapid expansion in communications based applications and their rapid divergence into many different markets requires technology that is highly flexible to meet rapidly evolving needs. It must be possible to quickly develop new systems and to alter and enhance existing systems in real-time without affecting any of the operations currently underway. Fourth, processing requirements. A problem with large communications systems is performance. A lot of performance enhancements may be obtained by increasing resources available to a system (i.e., more file servers, more data pipes, etc). However, the key to scalability is in reducing the amount of unnecessary processing at each point in the network (e.g., the number of message decodes and encodes is greatly reduced according to the present invention). Fifth, downstream status. Knowing that a message cannot be delivered to its destination early on in its processing greatly reduces the amount of memory and processing required as messages that cannot be delivered can be refused or discarded earlier on in the system. Accomplishing this requires that all components be able to determine the overall system state at any time. Sixth, latency. Latency is a key factor in integrated communications systems involving interactive voice, video, and other real time data. As such, process context switching, multiple data copies, unnecessary processing, etc., must all be minimized in any real-time monitoring system.

The present invention provides several advantages. First, the development of modules is greatly simplified as, unlike conventional systems which have to continuously decode/encode messages, queue them for transmission, manage hash lists, manage their own memory, etc., the present invention allows for the creation of light-weight modules which rely on the core infrastructure for these tasks or makes these tasks totally unnecessary. This allows programmers to concentrate on implementing application capability rather than the peripheral infrastructure otherwise required. The result is an application developed faster, with fewer bugs. Second, the development of new applications is greatly simplified by the ability to use multiple instances of already existing light-weight modules and setting up priority-based rules for the routing of data between them. The result is an application developed faster with fewer bugs and, equally important, the ability to spread the development out among a much larger group of programmers who do not have to interact closely with each other. Third, monitoring, audit, management, and diagnostic functionality can be added (or removed) at runtime without affecting system operation as all that needs to be done is to add/delete module instances and routing entries to the currently running system. Fourth, new enhancements can be added at runtime as all that needs to be done is to add new module instances and new routing to the currently running system. Fifth, updates can be made to the processing modules of a system at runtime simply by adding the updated module instances and new routing entries, waiting until existing transactions are finished, and then removing the obsolete module instances and rules that have now been routed around. Sixth, the visibility of all data (i.e., from the low level physical layer 1 to the top level application layer 7) to any module instance means that security and advanced routing and other application decisions can be made at any point using any or all contextual information. Seventh, the ability of the invention to support multiple instances of the same module concurrently reduces the complexity of the configuration of the module as otherwise it would have to handle multiple concurrent configurations. It also improves the ability to understand the resulting system and how it processes data. Eighth, the invention allows management capability to be developed independently from the main application as independent management modules can be developed which get the required module status and statistics information directly from the invention's data store as opposed to coding such functionality into the core system or scattering management code throughout the core processing code as is the current practice. Ninth, the invention allows multiple levels of rules to be applied to message routing. This multi-level approach allows messages to "drop through" to low level routes and so be routed to "cleanup" module instances if a match does not occur at the higher level.

Figure 9:
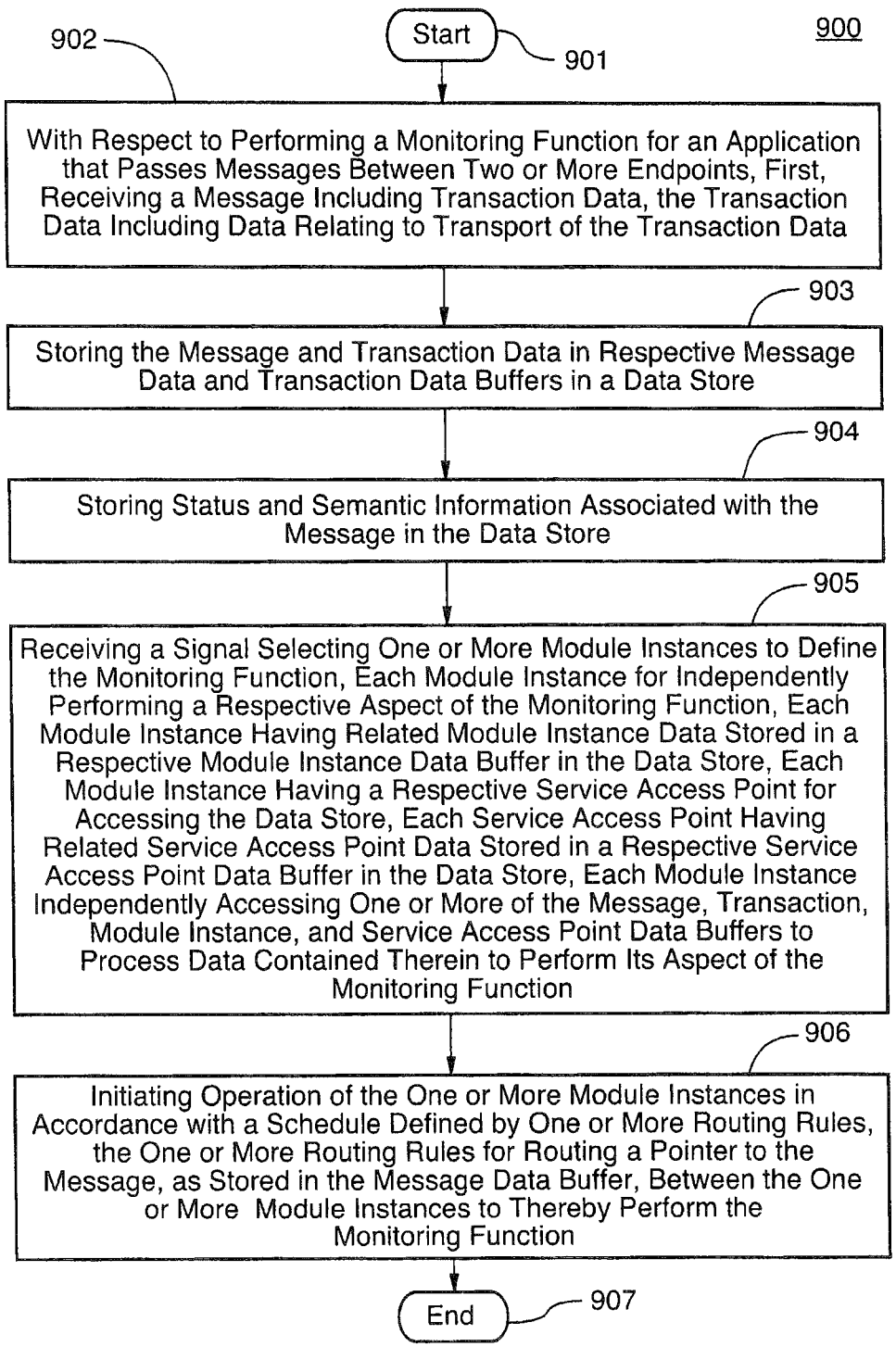

The general method of the invention may be summarized with the aid of a flowchart. FIG. 9 is a flow chart illustrating operations 900 of modules 331 within the memory 330 of a data processing system 300 for performing a monitoring function for an application that passes messages between two or more endpoints (e.g., data processing systems), in accordance with an embodiment of the invention.

At step 901, the operations 900 start.

At step 902, a message 410 including transaction data is received, the transaction data including data relating to transport of the transaction data.

At step 903, the message 410 and transaction data are stored in respective message data and transaction data buffers (e.g., 160, 150) in a data store 210.

At step 904, status and semantic information associated with the message 410 are stored in the data store 210.

At step 905, a signal is received selecting one or more module instances 220, 221, 222 to define the monitoring function, each module instance (e.g., 220) for independently performing a respective aspect of the monitoring function, each module instance 220 having related module instance data stored in a respective module instance data buffer (e.g., 120) in the data store 210, each module instance 220 having a respective service access point for accessing the data store 210, each service access point having related service access point data stored in a respective service access point data buffer (e.g., 130) in the data store 210, each module instance 220 independently accessing one or more of the message, transaction, module instance, and service access point data buffers 160, 150, 120, 130 to process data contained therein to perform its aspect of the monitoring function At step 906, operation of the one or more module instances 220, 221, 222 is initiated in accordance with a schedule defined by one or more routing rules 250, the one or more routing rules 250 for routing a pointer to the message 410, as stored in the message data buffer 160, between the one or more module instances 220, 221, 222 to thereby perform the monitoring function.

At step 907, the operations 900 end.

In the above method, the schedule may be further defined by a priority of the message and a priority of each of the one or more module instances 220, 221, 222. The one or more routing rules 250 may act on one or more attributes of one or more of the message, transaction data, module instance data, and service access point data to define the schedule. The method may further include receiving a signal defining the one or more routing rules, the signal providing a selection of the one or more attributes and one or more operators for acting on the one or more attributes. The one or more routing rules 250 may be stored in a database 250 (or a configuration file). The message may include a message generated by one or more of the one or more modules instances. The one or more operators may be one or more Boolean operators. The method may further include receiving a signal configuring one or more respective properties of the one or more module instances 220, 221, 222. The application may be one or more of a business application and a real-time application. And, the signal for selecting the one or more module instances 220, 221, 222 to define the monitoring function may be received through a user interface 380.

While this invention is primarily discussed as a method, a person of ordinary skill in the art will understand that the apparatus discussed above with reference to a data processing system 300, may be programmed to enable the practice of the method of the invention. Moreover, an article of manufacture for use with a data processing system 300, such as a prerecorded storage device or other similar computer readable medium including program instructions recorded thereon, may direct the data processing system 300 to facilitate the practice of the method of the invention. It is understood that such apparatus and articles of manufacture also come within the scope of the invention.

In particular, the sequences of instructions which when executed cause the method described herein to be performed by the data processing system 300 can be contained in a data carrier product according to one embodiment. This data carrier product can be loaded into and run by the data processing system 300. In addition, the sequences of instructions which when executed cause the method described herein to be performed by the data processing system 300 can be contained in a computer software product (e.g., software modules) according to one embodiment. This computer software product can be loaded into and run by the data processing system 300. Furthermore, the sequences of instructions which when executed cause the method described herein to be performed by the data processing system 300 can be contained in an integrated circuit product (e.g., hardware modules) including a coprocessor or memory according to one embodiment. This integrated circuit product can be installed in the data processing system 300. Moreover, the sequences of instructions which when executed cause the method described herein to be performed can be contained in an integrated circuit product (e.g., hardware modules, a field programmable gate array ("FPGA"), an application specific integrated circuit ("ASIC"), etc.) according to one embodiment. This integrated circuit product can be installed in the data processing system 300.

The embodiments of the invention described above are intended to be exemplary only. Those skilled in this art will understand that various modifications of detail may be made to these embodiments, all of which come within the scope of the invention.

What is claimed is:

1. A method for monitoring an application, comprising:
receiving a message from the application;
storing the message in a message data buffer in a data store;
selecting one or more module instances to define a monitoring function for the application, each module instance for independently performing a respective aspect of the monitoring function, each module instance independently accessing the message data buffer directly from the data store to process data contained therein to perform its aspect of the monitoring function; and,
using a processor, initiating operation of the one or more module instances in accordance with a schedule defined by one or more routing rules, the one or more routing rules for routing a pointer to the message, as stored in the message data buffer, between the one or more module instances to thereby perform the monitoring function without passing the message itself between the one or more module instances.

2. The method of claim 1 wherein the schedule is further defined by a priority of the message and a priority of each of the one or more module instances.

3. The method of claim 1 wherein the one or more routing rules act on one or more attributes of the message to define the schedule.

4. The method of claim 3 and further comprising selecting the one or more attributes and one or more operators for acting on the one or more attributes.

5. The method of claim 1 wherein the one or more routing rules are stored in a database.

6. The method of claim 1 wherein the message includes a message generated by one or more of the one or more module instances.

7. The method of claim 4 wherein the one or more operators are one or more Boolean operators.

8. The method of claim 1 and further comprising configuring one or more respective properties of the one or more module instances.

9. The method of claim 1 wherein the application is one or more of a business application and a real-time application.

10. The method of claim 1 wherein a signal for selecting the one or more module instances to define the monitoring function is received through a user interface.

11. The method of claim 1 and further comprising storing status and semantic information associated with the message in the data store.

12. A system for monitoring an application, comprising:
   a processor coupled to memory and an interface for receiving a message from the application;
   a data store for storing the message in a message data buffer in the data store;
   a user interface for selecting one or more module instances to define a monitoring function for the application, each module instance for independently performing a respective aspect of the monitoring function, each module instance independently accessing the message data buffer directly from the data store to process data contained therein to perform its aspect of the monitoring function; and,
   a scheduler for initiating operation of the one or more module instances in accordance with a schedule defined by one or more routing rules, the one or more routing rules for routing a pointer to the message, as stored in the message data buffer, between the one or more module instances to thereby perform the monitoring function without passing the message itself between the one or more module instances.

13. The system of claim 12 wherein the schedule is further defined by a priority of the message and a priority of each of the one or more module instances.

14. The system of claim 12 wherein the one or more routing rules act on one or more attributes of the message to define the schedule.

15. The system of claim 14 wherein the user interface receives a selection of the one or more attributes and one or more operators for acting on the one or more attributes.

16. The system of claim 12 wherein the one or more routing rules are stored in a database in the memory.

17. The system of claim 12 wherein the message includes a message generated by one or more of the one or more module instances.

18. The system of claim 15 wherein the one or more operators are one or more Boolean operators.

19. The system of claim 12 wherein the user interface receives a configuration of one or more respective properties of the one or more module instances.

20. The system of claim 12 wherein the application is one or more of a business application and a real-time application.

21. The system of claim 12 wherein status and semantic information associated with the message is stored in the data store.

* * * * *